United States Patent
Strandborg et al.

(10) Patent No.: US 11,568,574 B1
(45) Date of Patent: Jan. 31, 2023

(54) FOVEATION-BASED IMAGE ENCODING AND DECODING

(71) Applicant: Varjo Technologies Oy, Helsinki (FI)

(72) Inventors: Mikko Strandborg, Hangonkylä (FI); Ville Miettinen, Helsinki (FI); Ari Antti Erik Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 11 days.

(21) Appl. No.: 17/405,239

(22) Filed: Aug. 18, 2021

(51) Int. Cl.
| | |
|---|---|
| *G06T 9/00* | (2006.01) |
| *G06T 15/20* | (2011.01) |
| *G06T 3/40* | (2006.01) |
| *G06T 15/06* | (2011.01) |
| *G06F 3/01* | (2006.01) |

(52) U.S. Cl.
CPC ............ *G06T 9/00* (2013.01); *G06T 3/40* (2013.01); *G06T 15/06* (2013.01); *G06T 15/20* (2013.01); *G06F 3/013* (2013.01)

(58) Field of Classification Search
CPC ...................................................... G06T 9/00
See application file for complete search history.

(56) References Cited

U.S. PATENT DOCUMENTS

| | | | |
|---|---|---|---|
| 11,094,089 B1 | 8/2021 | Strandborg et al. | |
| 2008/0036875 A1 | 2/2008 | Jones et al. | |
| 2018/0220119 A1 | 8/2018 | Horvitz et al. | |
| 2019/0051055 A1* | 2/2019 | Leppänen | G06V 20/20 |
| 2019/0206131 A1* | 7/2019 | Kamal | G06T 7/74 |

FOREIGN PATENT DOCUMENTS

| | | |
|---|---|---|
| EP | 3457706 A1 | 3/2019 |
| WO | 2017202899 A1 | 11/2017 |

OTHER PUBLICATIONS

Boyce, Jill, M, "Comfort Noise for Compressed Video, 2005 Digest of Technical Papers, International Conference on Consumer Electronics, pp. 323-324, XP010796662, DOI: 10.1109/ICCE.2005. 1429848, ISBN" 978-0-7803-8838-3, Jan. 8, 2005, 2 pages.
Notification of Transmittal of The International Search Report and The Written Opinion of The International Searching Authority, or The Declaration, Application No. PCT/FI2022/050441, dated Sep. 19, 2022, 17 pages.

* cited by examiner

*Primary Examiner* — Shivang I Patel
(74) *Attorney, Agent, or Firm* — Ziegler IP Law Group, LLC

(57) ABSTRACT

An encoding method and a decoding method. The encoding method includes generating curved image by creating projection of visual scene onto inner surface of imaginary 3D geometric shape that is curved in at least one dimension; dividing curved image into input portion and plurality of input rings; encoding input portion and input rings into first planar image and second planar image, respectively, such that input portion is stored into first planar image, and input rings are packed into corresponding rows of second planar image; and communicating, to display apparatus, first and second planar images and information indicative of sizes of input portion and input rings.

27 Claims, 7 Drawing Sheets

FOVEATION-BASED IMAGE ENCODING AND DECODING

TECHNICAL FIELD

The present disclosure relates to foveation-based encoding methods. Moreover, the present disclosure also relates to foveation-based decoding methods.

BACKGROUND

In recent past, devices which allow users to have an immersive experience of an extended reality (XR) environment are being extensively developed. Such XR devices utilize image rendering techniques to render XR images that are perceivable by a user's eye. The XR images are typically processed to have a wide field of view (for example, such as, more than 100 degrees along a given dimension). Pixels of these XR images, when rendered using perspective projection for example, get deformed and have improper pixel density at edges of the XR images. Moreover, rendering the XR images with such wide fields of view increases an effective PPD (pixels per degree) with respect to an incident angle with an image surface from a centre of the image surface, such that the pixel density at the edges is higher than a pixel density at a central portion of the XR images. For example, the pixel density more than doubles at the edges of the XR images as compared to the central portions. This means that a significant number of pixels are spent on extreme corners of such images, at the expense of a required resolution at the central portion of the image. This problem worsens further as the field of view is increased.

Moreover, polar coordinate system-based foveated encoding and decoding of planar XR images is performed such that a resolution of a given XR image is highest in a gaze-contingent portion thereof, and the resolution gradually decreases to a lowest resolution on moving away from the gaze-contingent portion. However, such planar XR images cannot be processed to have a field of view that is wide enough to cover a field of view of a human eye (for example, such as around 170 degrees per eye). This leads to a poor viewing experience for the user.

Furthermore, when using planar mapping on a log-polar foveated coordinate system, an off-centre projection matrix is required to be used as an origin of said coordinate system is at a gaze location. As a result, a pixel density in the XR images does not change uniformly in all directions, but instead, is a product of a PPD curve and a density curve, causing various inaccuracies in implementing processing techniques such as reprojection, filtering, and the like. Conventional image encoders and decoders are limited in their ability to provide such foveated XR images, often sacrificing image quality to perform a high degree of image downsampling for transportation. This loss in image quality of the XR images is perceivable as deformed and improperly arranged pixels when downsampled XR images are upsampled (by the conventional image decoders) and rendered at light sources of the XR devices. The perceivable loss in image quality of the XR images reduces the user's immersion within the XR environment.

Therefore, in light of the foregoing discussion, there exists a need to overcome the aforementioned drawbacks associated with conventional image encoders and decoders.

SUMMARY

The present disclosure seeks to provide an encoding method. The present disclosure also seeks to provide a decoding method. An aim of the present disclosure is to provide a solution that overcomes at least partially the problems encountered in prior art.

In one aspect, an embodiment of the present disclosure provides an encoding method comprising:
- generating a curved image by creating a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment;
- dividing the curved image into an input portion and a plurality of input rings;
- encoding the input portion and the plurality of input rings of the curved image into a first planar image and a second planar image, respectively, wherein the step of encoding comprises:
- storing the input portion of the curved image into the first planar image;
- packing the plurality of input rings of the curved image into the second planar image, the second planar image having a plurality of rows, a given input ring of the curved image being packed into a corresponding row of the second planar image; and
- communicating, to a display apparatus, the first planar image, the second planar image and information indicative of a size of the input portion and sizes of the plurality of input rings.

In another aspect, an embodiment of the present disclosure provides a decoding method, implemented at a display apparatus, comprising:
- obtaining a first planar image, a second planar image and information indicative of a size of an output portion and sizes of a plurality of output rings;
- extracting the output portion from the first planar image based on the size of the output portion;
- unpacking the plurality of output rings from a plurality of rows of the second planar image based on the sizes of the plurality of output rings;
- assembling the output portion and the plurality of output rings to generate a curved image, wherein the curved image represents a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment; and
- generating from the curved image a planar image for display at the display apparatus, wherein the step of generating comprises:
- determining, for a given pixel in the planar image, a corresponding location in the curved image; and
- employing a pixel sample of the corresponding location in the curved image to generate a pixel value of the given pixel in the planar image.

Embodiments of the present disclosure substantially eliminate or at least partially address the aforementioned problems in the prior art, and enable improved foveation-based encoding and decoding.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B illustrate an imaginary 3D geometric shape and a curved image generated using the imaginary 3D geometric shape, in accordance with different embodiments of the present disclosure, while

FIG. 4A illustrates a first planar image, while

Figure 1:
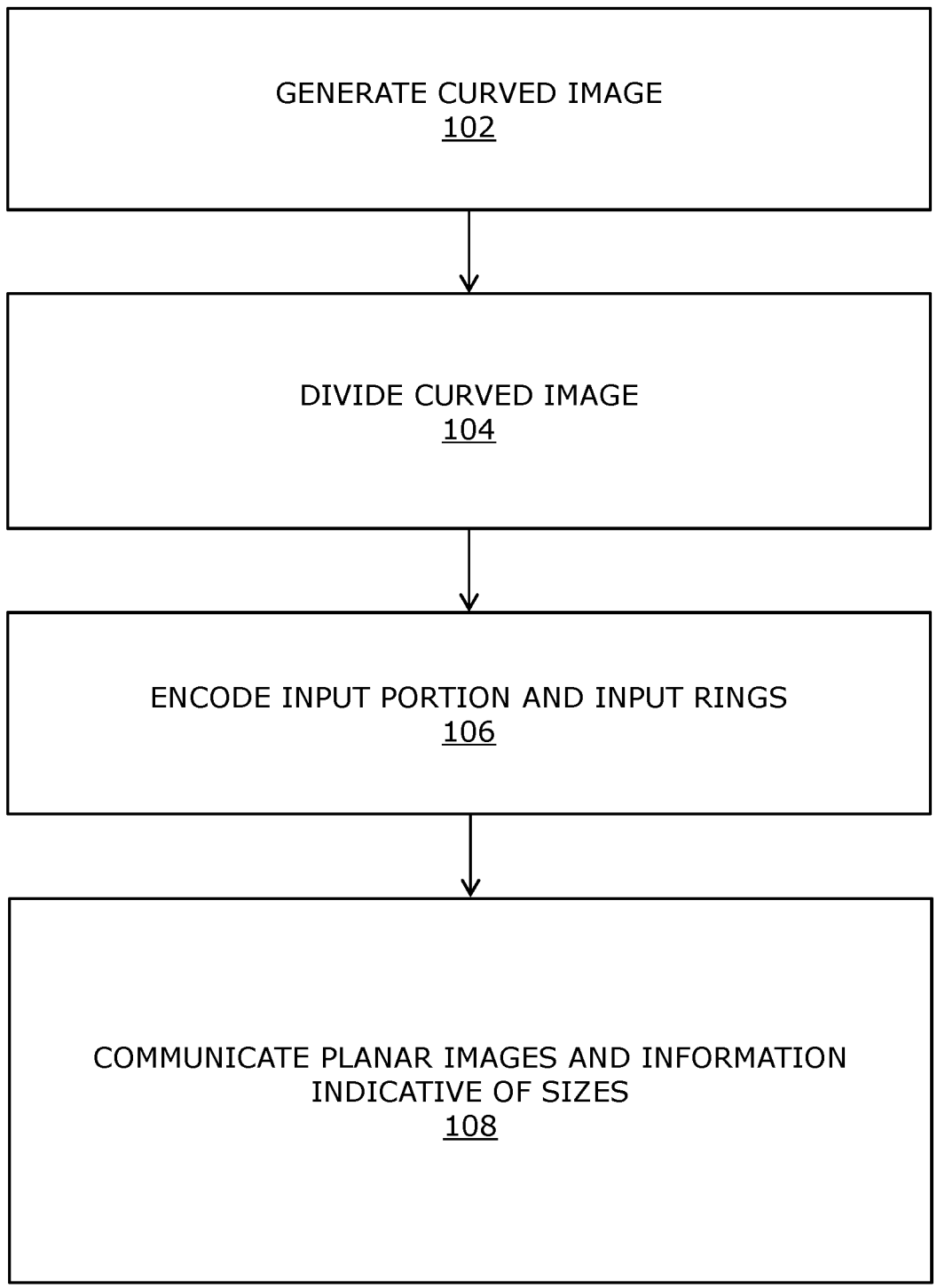
FIG. 1 illustrates steps of an encoding method, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an encoding method comprising:
generating a curved image by creating a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment;
dividing the curved image into an input portion and a plurality of input rings;
encoding the input portion and the plurality of input rings of the curved image into a first planar image and a second planar image, respectively, wherein the step of encoding comprises:
storing the input portion of the curved image into the first planar image;
packing the plurality of input rings of the curved image into the second planar image, the second planar image having a plurality of rows, a given input ring of the curved image being packed into a corresponding row of the second planar image; and
communicating, to a display apparatus, the first planar image, the second planar image and information indicative of a size of the input portion and sizes of the plurality of input rings.

In another aspect, an embodiment of the present disclosure provides a decoding method, implemented at a display apparatus, comprising:
obtaining a first planar image, a second planar image and information indicative of a size of an output portion and sizes of a plurality of output rings;
extracting the output portion from the first planar image based on the size of the output portion;
unpacking the plurality of output rings from a plurality of rows of the second planar image based on the sizes of the plurality of output rings;
assembling the output portion and the plurality of output rings to generate a curved image, wherein the curved image represents a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment; and
generating from the curved image a planar image for display at the display apparatus, wherein the step of generating comprises:
determining, for a given pixel in the planar image, a corresponding location in the curved image; and
employing a pixel sample of the corresponding location in the curved image to generate a pixel value of the given pixel in the planar image.

The present disclosure provides the aforementioned encoding method and the aforementioned decoding method. The encoding method can be beneficially utilized to create the projection of the visual scene onto the imaginary 3D geometric shape, which does not deform pixel samples in the curved image, while evenly placing pixel samples within the curved image in order to emulate human eye resolution. A curvature of the imaginary 3D geometric shape provides a much more optimal projection surface than a planar surface, and therefore effectively enables in overcoming problems such as pixel deformation and uneven (i.e., improper) density of pixel samples that are associated with planar images. The encoding method utilizes foveation-based encoding of the curved image in order to maintain a high image quality whilst effectively reducing image size of the curved image. The encoding method allows for the curved image to have a field of view that is wide enough to emulate human vision (for example, such as, 170 degrees per eye), while allowing a gradual decrease in a pixel density of the curved image from a given point (i.e., a gaze-contingent point) to a periphery of the curved image. Moreover, the first and second planar images generated upon using the aforesaid encoding method require lesser storage and transmission resources as compared to the curved image. As data transmission requirements are lowered, the first and second images can be conveniently transferred using a wireless communication interface. The encoding and decoding methods can be utilized to encode and decode visual content of images, depth information of images, transparency information of images, and the like, for efficient transmission and/or rendering of images.

Throughout the present disclosure, the term "encoding method" refers to a method for generating and encoding curved images. Encoding of the curved images reduces a file size of the curved image, such that the curved image may be communicated speedily in its encoded form. The aforesaid encoding method is implemented via an encoder. Herein, the term "encoder" refers to specialized equipment that, in operation, encodes images. The encoder encodes the curved image to yield the first planar image and the second planar image (hereinafter collectively referred to as "encoded images"), wherein the second planar image is a compact representation of visual content of a region surrounding the input portion of the curved image. These encoded images require lesser storage and transmission resources as compared to the curved image. When the encoded images are communicated to the display apparatus, the encoded images are transmitted from the encoder to the display apparatus in a bandwidth-efficient manner.

The encoder comprises a processor configured to execute the encoding method. The processor of the encoder is configured to implement the aforesaid steps of the encoding method. Optionally, the encoder is external to the display apparatus. In other words, the encoder is separate from the display apparatus. In an embodiment, the encoder is wirelessly coupled to the display apparatus, via a wireless communication interface. In another embodiment, the encoder is coupled to the display apparatus in a wired manner, via a wired communication interface.

Throughout the present disclosure, the "curved image" refers to an image that is curved and is to be encoded. The curved image has visual content, which encompasses not only colour information represented in the curved image, but also other attributes associated with the image (for example, such as depth information, transparency information, and the like). The curvature of the curved image emulates human visual properties, since a human eye is built similarly, with its retina being curved.

Optionally, the projection of the visual scene of the extended-reality (XR) environment is created using a light source. In an embodiment, the light source is implemented as a projector. Examples of the projector include, but are limited to, a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector. In another embodiment, the light source is implemented as a display. Optionally, the display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display. A technical benefit of generating the curved image in such manner is to create an optimal curved projection surface in comparison to a planar projection surface, since the curvature of the imaginary 3D geometric shape emulates human eye vision.

The visual scene of the XR environment refers to a scene that is extracted from an entirety of the XR environment. Throughout the present disclosure, the term "extended-reality" encompasses virtual reality (VR), augmented reality (AR), mixed reality (MR), and the like. Optionally, the XR environment is sampled using the position of the user's eye, to produce the visual scene.

The imaginary 3D geometric shape is an imaginary three-dimensional geometric shape that is curved. The 3D geometric shape may be curved in a single dimension, or a plurality of dimensions. Examples of the imaginary 3D geometric shape include, but are limited to, a sphere, a cylinder, a cone, an ellipsoid, and a torus. The imaginary 3D geometric shape is considered to be transparent, hence, an outer surface of the 3D geometric shape would also have the projection of the visual scene on the inner surface of the 3D geometric shape. In other words, pixel samples on an outer surface of the imaginary 3D geometric shape can be considered the same as pixel samples projected on the inner surface of the imaginary 3D geometric shape.

Optionally, the position of the user's eye is determined by a pose of a head-mounted display (HMD) device worn by a user and a relative position of the user's eye with respect to the HMD device when the HMD device is worn by the user, wherein the pose of the HMD device refers to a position and an orientation of the HMD device. The pose of the HMD device is measured using a pose-tracking means. The relative position of the user's eye may be determined using various techniques known in the art. For example, the relative position of the user's eye may be determined by determining the user's inter-pupillary distance using images captured by a gaze tracker, and the like. The term "pose" encompasses both a position and an orientation. The pose-tracking means could be implemented as an internal component of the HMD device, as a tracking system external to the HMD device, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

Optionally, the curved image has a spatially-variable resolution. The term "spatially-variable resolution" means that a resolution of the curved image varies spatially across the curved image. In other words, different regions of the curved image have different angular resolutions. The angular resolution of a given image or a region of the given image is measured in terms of a number of pixels per degree (namely, points per degree (PPD)) of an angular width of the given image or the region of the given image, wherein the angular width is measured from an imaginary point in a three-dimensional space, or a number of pixels per unit area in the given image or the region of the given image. For example, the curved image may have three regions A, B, and C with spatially varying resolution, such that the region A has an angular resolution of 60 PPD, the region B has an angular resolution of 40 PPD, and the region C has an angular resolution of 20 PPD. Herein, the region A has highest angular resolution, the region B has lower angular resolution, and the region C has lowest angular resolution. The curved image having the spatially-variable resolution mimics human eye resolution.

The curved image is divided into the input portion and the plurality of input rings. In other words, the curved image is divided into different regions: the input portion and the plurality of input rings. Optionally, the plurality of input rings are concentric with the input portion. In other words, a centre of the input portion coincides with a centre of each input ring amongst the plurality of input rings.

The input portion and the plurality of input rings may be shaped as a simple closed curve. Herein, the term "simple closed curve" refers to a connected curve that does not cross itself and ends at the same point where it begins. Examples of a given simple closed curve include, but are not limited to, polygons, circles, ellipses, and freeform closed curves. Notably, despite use of the word "curve" in its name, a simple closed curve is not necessarily curved in shape. It will be appreciated that the given simple closed curve is made up of line segments only, curved lines only, or a combination of line segments and curved lines. When the given simple closed curve is made up of line segments only, the given simple closed curve is a polygon (for example, such as a square, a rectangle, a hexagon, an octagon, and the like). When the given simple closed curve is made up of curved lines only, the given simple closed curve has a curved shape (for example, such as a circle, an ellipse, and the like).

In an embodiment, the encoding method further comprises:
obtaining, from the display apparatus, information indicative of a gaze direction of a user;
determining a gaze point of the curved image based on the gaze direction of the user; and
identifying a line connecting the centre of the imaginary 3D geometric shape with the gaze point of the curved image as a zenith direction,
wherein the input portion and the plurality of input rings are arranged symmetrically about the zenith direction.

In this regard, it will be appreciated that division of the curved image into the input portion and the plurality of input rings is performed dynamically, according to the zenith direction which is identified based on the gaze point. The gaze point serves as a common centre of the input portion and the plurality of input rings. Therefore, the input portion and the plurality of input rings are considered to be arranged symmetrically about the zenith direction. When a given input ring is arranged symmetrically about the input portion or another input ring, a thickness of the given input ring is same throughout an extent of the given input ring. Alternatively, when the given input ring is arranged asymmetrically about the input portion or another input ring, a thickness of the given input ring varies throughout an extent of the given input ring. According to known properties of a visual system of the user's eye, the gaze point and a region of the curved image that immediately surrounds the gaze point are resolved to a much greater degree of visual detail by the user's eye, as compared to a remaining region of the curved image. This dynamic manner of dividing the curved image according to the gaze direction (and specifically, the zenith direction) of the user emulates a manner in which users generally focus within their field of view. Therefore, this embodiment pertains to active-foveation based encoding of the curved image using the encoding method.

Throughout the present disclosure, the term "gaze point" refers to a point in a given image that corresponds to the gaze of the user. Notably, the user is not shown the curved image, but is instead shown the planar image (which is displayed at the display apparatus). The gaze direction of the user that is determined whilst the user views a given planar image is used for determining a gaze point of a curved image corresponding to a next planar image. Notably, the gaze direction of the user is mapped (for example, by the encoder) to a corresponding point within the curved image to determine the gaze point of the curved image. Optionally, the display apparatus comprises a gaze-tracking means, wherein the encoder is configured to obtain, from the gaze-tracking means, the information indicative of the gaze direction of the user.

When the curved image is divided dynamically in the aforesaid manner about the zenith direction, the input portion corresponds to the region of the curved image immediately surrounding (and including) the gaze point, whereas the plurality of input rings correspond to the remaining region of the curved image surrounding the input portion. The gaze point may or may not be at the centre of the curved image. As an example, the gaze point may correspond to a point in a top-right portion of the curved image.

In another embodiment, the encoding method further comprises identifying a line connecting the centre of the imaginary 3D geometric shape with a centre of the curved image as a zenith direction, wherein the input portion and the plurality of input rings are arranged symmetrically about the zenith direction. In such a case, the input portion and the plurality of input rings are centred at the centre of the curved image. Therefore, a central region of the curved image corresponds to the input portion, whereas a peripheral region of the curved image corresponds to the plurality of input rings, wherein the peripheral region surrounds the central region.

In this regard, it will be appreciated that division of the curved image into the input portion and the plurality of input rings is performed according to the (fixed) zenith direction. The input portion and the plurality of input rings are considered to be arranged symmetrically about the centre of the curved image. Generally, a user's gaze is directed towards a centre of his/her field of view. When the user wishes to view objects in a periphery of his/her field of view, the user typically turns his/her head in a manner that said objects lie at a centre of his/her current field of view. In such a case, the central portion of the user's field of view is resolved to a much greater degree of visual detail by the visual system of the user's eye, as compared to the peripheral portion of the user's field of view. This manner of dividing the curved image emulates a way in which users generally focus within their field of view. Therefore, this embodiment pertains to fixed-foveation based encoding of the curved image using the encoding method.

The input portion is stored into the first planar image. Throughout the present disclosure, the term "first planar image" refers to an image that represents the input portion of the curved image in a planar form. Optionally, the input portion is copied into the first planar image. Notably, the input portion is stored at its original spatial resolution into the first planar image. A spatial resolution of the first planar image is same as the original spatial resolution of the input portion of the curved image. The first planar image can be understood to be a two-dimensional copy of visual content of the input portion.

The plurality of input rings are packed into the second planar image. The second planar image has a plurality of rows corresponding to the plurality of input rings. The given input ring of the curved image is packed entirely into the corresponding row of the second planar image. Throughout the present disclosure, the term "second planar image" refers to a downsampled planar image that is generated by packing the plurality of input rings of the curved image, in a compact form. The second planar image represents visual content of the plurality of input rings in a downsampled form (i.e., at a lesser degree of visual detail than the plurality of input rings). Herein, the term "packing" refers to an image processing technique in which the plurality of input rings of the curved image are downsampled and rearranged into the second planar image in a manner that one input ring is packed into one row of the second planar image. It will be appreciated that a number of rows of the second planar image is equal to a number of input rings among the plurality of input rings. A technical benefit of encoding the input portion and the plurality of rings in the first planar image and the second planar image, respectively, is to reduce a file size of the curved image (which in-turn reduces a transfer speed thereof) whilst preserving geometry and density of pixel samples of the curved image.

A width of a given row in the second planar image may mathematically be represented by:

$$R_{len} = 2\pi \sin \theta_0 \cdot PPD_0 \text{pixels}$$

wherein $PPD_0$ is a desired maximum angular resolution (calculated in pixels per degree) required at the input portion of the curved image, and $\theta_0$ is an inclination angle from the zenith direction (namely, a pole with respect to which inclination angles are measured). For example, the desired maximum angular resolution required at the input portion of the curved image may be 60 PPD, which is similar to a resolution of a fovea of a human eye.

Optionally, the plurality of input rings are packed sequentially into the plurality of rows of the second planar image. In such a case, an innermost input ring (namely, a first input ring that is adjacent to the input portion) is packed into a first row (namely, a top row) of the second planar image, an input ring adjacent to the innermost input ring is packed into a second row of the second planar image, and so on until an outermost input ring is packed into a last row (namely, a bottom row) of the second planar image.

Optionally, the step of generating the curved image comprises:
rasterizing an entire field of view of the visual scene of the extended-reality environment into a first framebuffer at a first resolution; and
rasterizing a portion of the field of view of the visual scene that corresponds to at least the input portion of the curved image into a second framebuffer at a second resolution, the second resolution being higher than the first resolution, further wherein the step of encoding comprises:
selecting, for a given pixel of the curved image, a pixel value having a highest resolution available from the first resolution of the first framebuffer and the second resolution of the second framebuffer; and
using the selected pixel value for the given pixel of the curved image during the step of storing and optionally during the step of packing.

The term "rasterizing" refers to a process of generating two-dimensional images through traditional Graphics Processing Unit (GPU) rendering methods. As an example, each triangle (representing surfaces in the XR environment) may be painted to a framebuffer. The term "framebuffer" refers to a memory buffer that is used for driving a given light source. The curved image may be generated by generating at least some portions of the field of view of the visual scene as two-dimensional images at different resolutions into separate framebuffers, and using a highest resolution input available for each pixel sample as an input for the generation of the curved image. The curved image is a tunnelized version of the two-dimensional images. A technical benefit of this is that it provides a high quality of encoding, whilst also reducing computational burden on the GPU.

It will be appreciated that optionally the entire field of view is rasterized into a low (first) resolution, and the portion of the field of view corresponding to at least the input portion of the curved image is rasterized at a high (second) resolution as compared to the entire field of view. Said portion of the field of view may be considered as a region of focus for the user's eye and would be resolved to a high degree of visual detail by the user's eye, requiring said portion to have the high resolution. However, the entire field of view would not be resolved to the high degree of visual detail by the user's eye, and would not require the entire field of view to have high resolution. Such a step of generating the curved image by rasterization at different resolutions provides significant savings in rendering costs and reduction of burden on the GPU since the entire field of view is not being rasterized at the high second resolution.

The term "pixel value" refers to a measure of at least one characteristic of a given pixel. Optionally, the at least one characteristic of the given pixel may be a colour of the pixel, a location of the pixel, a depth of the pixel, an opacity of the pixel, a texture of the pixel, and the like. Since the portion of the field of view corresponding to at least the input portion of the curved image is rasterized into both the first framebuffer at the first resolution (i.e., the low resolution) and the second framebuffer at the second resolution (i.e., the high resolution), there would exist at least two pixel values for the given pixel in the input portion. Notably, for pixels in the input portion, the pixel values are selected from the second framebuffer to ensure a high quality of encoding for the input portion.

In an embodiment, the step of storing comprises employing any of: perspective projection, ray tracing to create from the input portion the first planar image, and wherein the step of packing comprises:
employing any of: perspective projection, ray tracing to create from each of the plurality of input rings a corresponding 2D ring; and
packing the corresponding 2D ring into a corresponding row of the second planar image.

The term "perspective projection" refers to a rendering technique for displaying a three-dimensional object (or, a projection thereof) onto a planar (namely, two-dimensional) surface to approximate actual visual perception. The term "ray tracing" refers to a rendering technique for generating the given image by tracing a ray as pixel samples in an image plane and simulating effects of an encounter of the ray with virtual objects in the visual scene to determine pixel values of the pixel samples.

Optionally, the input portion is stored onto the first planar image at a first angular resolution. The first angular resolution is freely selectable. For example, the first angular resolution may be 60 pixels per degree (PPD). Optionally, a given 2D ring is created by down-sampling a corresponding input ring. These input rings may be considered as curved textures that are previously rendered when generating the curved image, while the given 2D ring is a planar texture. Optionally, the given 2D ring is packed into its corresponding row of the second planar image at a second angular resolution, wherein the second angular resolution is less than or equal to the first angular resolution. As an example, a first 2D ring corresponding to an input ring which is adjacent to the input portion may be packed into a corresponding row of the second planar image at the first angular resolution. A remainder of 2D rings may be packed into corresponding rows of the second planar image at lower second angular resolutions. For example, the second angular resolution may lie in a range of 15 PPD to 60 PPD.

In another embodiment, the light source employed by the encoder is configured to employ perspective projection or ray tracing directly to generate the encoded images. A light source employed by the display apparatus may be modified to match the zenith direction, about which the curved image is generated, to provide the planar image for displaying. Herein, the curved image is not generated, and the first planar image and the second planar image are generated directly from each sample of the visual scene.

Throughout the present disclosure, the term "display apparatus" refers to a specialized equipment that is configured to present the XR environment to the user when the display apparatus in operation is worn by the user on his/her head. In such an instance, the display apparatus acts as a device (for example, such as an XR headset, a pair of XR glasses, and the like) that is operable to present the visual scene of the XR environment to the user. Commonly, the display apparatus is referred to as "head-mounted display apparatus", for the sake of convenience only. Optionally, the display apparatus is the HMD device.

At the display apparatus, the communicated first planar image, second planar image and the information indicative of the size of the input portion and the sizes of the plurality of input rings are used for decoding images. The "information indicative of the size of the input portion and the sizes of the plurality of input rings" comprises at least one of:
dimensions of the input portion;
dimensions of each input ring among the plurality of input rings, wherein said dimensions are measured in pixels;
angular resolution of the input portion and each input ring among the plurality of input rings;
mathematical functions employed for determining the dimensions of each input ring among the plurality of input rings.

Optionally, when the imaginary 3D geometric shape is the sphere, the size of the input portion can be measured in terms of the inclination angle as measured from the zenith direction.

It will be appreciated that the first planar image and the second planar image are communicated repeatedly to the display apparatus, according to a rate at which the curved image and the encoded images are generated. However, the information indicative of the size of the input portion and sizes of the plurality of input rings could be:
communicated just once at a time of beginning of operation of the display apparatus (for example, when all curved images are encoded in the same manner);
communicated repeatedly to the display apparatus, according to a rate at which the first planar image and the second planar image are communicated; or
pre-known to a decoder of the display apparatus.

Spherical Implementation of Imaginary 3D Geometric Shape

A technical advantage of the imaginary 3D geometric shape being the sphere is that the second planar image resembles an image which is encoded using a log-polar coordinate system, which when decoded, would enable the planar image (for display at the display apparatus) to wrap around the user's eye such that it allows a maximum field of view of $360-2\theta_0$ degrees.

Optionally, the imaginary 3D geometric shape is a sphere, wherein the step of dividing comprises:
identifying a line connecting the centre of the sphere and a given point of the curved image as a zenith direction;
identifying a plurality of circles of the sphere that are arranged symmetrically about the zenith direction;
determining an innermost circle from amongst the plurality of circles of the sphere as the input portion; and
determining a given ring formed between two adjacent circles of the sphere as a given input ring.

The term "given point of the curved image" refers to a point of the curved image which lies at a centre of the input portion of the curved image. Optionally, the given point of the curved image is the gaze point. Alternatively, optionally, the given point of the curved image is the centre of the curved image. Moreover, the given point of the curved image lies on the zenith direction. Optionally, the centre of the sphere lies at the position of the user's eye, such that an inclination angle for the given point of the curved image is zero degrees. The term "inclination angle ($\theta$)" refers to an angle formed between the zenith direction and a point on the curved image.

The term "circle of the sphere" refers to a circle lying on the sphere, which can be formed by intersecting the sphere with a planar surface, a three-dimensional surface, or another sphere. Optionally, a portion of the sphere having the curved image is intersected by a plurality of planar surfaces to form the plurality of circles of the sphere, wherein the plurality of planar surfaces are parallel to each other and are perpendicular to the zenith direction. This provides the plurality of circles of the sphere to be symmetrical about the zenith direction.

Optionally, the innermost circle amongst the plurality of circles is a smallest circle (when measured in size). Moreover, the given point of the curved image lies within the innermost circle and specifically, at a centre of the innermost circle, determining the innermost circle as the input portion. In other words, the innermost circle is determined such that the inclination angle of each point in the innermost circle is less than a predetermined inclination angle ($\theta_0$). Optionally, the innermost circle is nearly planar, since the inclination angle of each point in the innermost circle is less than the predetermined inclination angle (for example, such as 30 degrees).

Optionally, the given ring formed between the two adjacent circles of the sphere is determined as the given input ring. The given ring corresponds to a rim-like portion of the curved image and is determined as the given input ring. Optionally, a plurality of rings formed between two adjacent circles of the sphere from amongst the plurality of circles of the sphere are determined as the plurality of input rings. Beneficially, the sphere is curved in three dimensions, allowing the curved image to be curved in three dimensions, such that a field of view of the curved image emulates natural human eye vision.

Optionally, the imaginary 3D geometric shape is the sphere, the step of creating the projection of the visual scene of the XR environment further comprises:
mapping an x coordinate and a y coordinate of the visual scene of the XR environment to the inclination angle and an azimuthal angle of a spherical coordinate system; and
mapping a z coordinate of the visual scene of the XR environment to at least one radial coordinate in the spherical coordinate system;

wherein the at least one radial coordinate represents an optical depth of the pixel samples of the curved image from the user's eye and is stored in at least one depth buffer.

The term "azimuthal angle (φ)" refers to an angle formed between a reference direction and a projection of a line connecting a point on the curved image with the position of the user's eye, the reference direction and the projection being on a same plane, and the reference direction being orthogonal to the zenith direction. A direction pointing towards φ=0 and a chirality of a given coordinate system are matters of convention and are required to be same in both the encoding method and the decoding method. The term "radial" refers to a direction along a radius from the centre of the imaginary 3D geometric shape, or perpendicular to a curved path.

Optionally, the step of packing comprises packing pixel samples of a given input ring into a corresponding row in the second planar image in an order of increasing azimuth. Herein, the term "azimuth" refers to the azimuthal angle. The azimuth can be measured in a clockwise direction or an anticlockwise direction, and increases on going away from the reference direction. The pixel samples may be sequentially packed either in a clockwise manner, or in an anti-clockwise manner, depending on a selected convention. Packing the pixel samples of the given input ring in the order of increasing azimuth enables packing neighbouring pixels in a sequential manner into a corresponding row in the second planar image. This improves an efficiency of the encoding method, which, in turn, improves an accuracy of the decoding method.

Optionally, each of the plurality of circles of the sphere is identified based on a function that maps a given inclination angle of a given circle of the sphere to an angular resolution required for the given inclination angle. The given inclination angle of the given circle of the sphere is determined by determining an inclination angle of a point on the given circle of the sphere. Moreover, the angular resolution may vary spatially throughout the curved image, hence, the angular resolution required for the given inclination angle may also vary. It will be appreciated that as different circles of the sphere have different inclination angles, each input ring formed between two adjacent circles have a range of inclination angles associated therewith, and correspondingly have variable angular resolution defined according to said function. An example of the function that retains a 1:1 aspect ratio of the pixel samples throughout the curved image may be mathematically represented as:

$$PPD(\theta) = \frac{K}{\sin\theta}$$

wherein each pixel sample has a 1:1 aspect ratio, such that $K=\sin\theta_0 \cdot PPD_0$, wherein $\theta_0$ is an inclination angle of an innermost input ring, and $PPD_0$ is an angular resolution (i.e., a pixels-per-degree density) at the innermost input ring.

Integrating this value of K over the inclination angle yields a function for mapping inclination angles into coordinates of pixel samples in the plurality of rows of the second planar image, and is mathematically represented as:

$$R_x(\theta) = K \cdot \ln \tan\frac{\theta}{2} - K_0,$$

wherein 'x' denotes coordinates of pixel samples in the plurality of rows and $K_0$ is calculated by:

$$K_0 = K \cdot \ln \tan\frac{\theta_0}{2}.$$

Solving the above-mentioned equation for the inclination angle yields a function for mapping coordinates of pixel samples in the plurality of rows of the second planar image to inclination angles, and is mathematically represented as:

$$R_\theta(x) = 2\tan^{-1} e^{\frac{K_0+x}{K}},$$

wherein said function is used when generating the planar image from the curved image, in the decoding method.

Optionally, thicknesses of the plurality of input rings increase on going from the given point of the curved image towards a periphery of the curved image according to said function, and wherein the plurality of rows of the second planar image have a same height. Throughout the present disclosure, the "thickness" of a given ring refers to a distance between a first point on an outer edge of the given ring and a second point on an inner edge of the given ring, the first point and the second point lying along a normal extending between the outer edge and the inner edge. Herein, the term "ring" encompasses both input rings as well as output rings. Throughout the present disclosure, the "height" of a given row of the second planar image refers to a distance between two opposite boundaries of the given row. The height of the given row may be equal to or smaller than the thickness of the corresponding given ring. The height of the given row is selected as required, so as to enable proper storage of the corresponding input ring into the second planar image. As an example, a given input ring may have a thickness equal to four pixels, whereas its corresponding row in the second planar image may have a height equal to one pixel.

When the thicknesses of the plurality of input rings vary as described hereinabove, an input ring that is closest to the given point has minimum thickness, whereas an input ring that is farthest from the given point has maximum thickness, as the thicknesses of the plurality of input rings increases progressively on going away from the given point towards the periphery of the curved image. Therefore, the plurality of input rings seem to demonstrate variable thicknesses, spatially. It will be appreciated that when the thicknesses of the plurality of input rings is variable and the heights of the plurality of rows of the second planar image are constant (namely, uniform), different input rings are downsampled to different extents to yield their corresponding rows (having the constant height) of the second planar image. Optionally, the thicknesses of the plurality of input rings and the heights of the plurality of rows are measured in pixels. Alternatively, optionally, the thicknesses of the plurality of input rings and the heights of the plurality of rows are measured in degrees.

Alternatively, optionally, the plurality of input rings have a same thickness, and heights of the plurality of rows of the second planar image vary according to said function. In this regard, the heights of the plurality of rows decrease as the angular distance of their corresponding input rings from the given point of the curved image increases. When all input rings have the same thickness, different rows corresponding to different input rings have variable heights depending on the angular distance of their corresponding input ring from the given point of the curved image. Lesser an angular distance of a given input ring from the given point, greater is a height of a corresponding row of the given input ring, and vice versa. Therefore, the heights of the rows decrease progressively on their corresponding input rings going away from the given point towards the periphery of the curved image. In such a case, different input rings are downsampled to different extents to yield their corresponding rows (having varying heights).

Optionally, the encoding method further comprises communicating, to the display apparatus, information indicative of the function that maps the given inclination angle of the given circle of the sphere to the angular resolution required for the given inclination angle. Said communication is sent from the encoder to the display apparatus, as it is required during decoding. At the display apparatus, the communicated information indicative of the function that maps the given inclination angle of the given circle of the sphere to the angular resolution required for the given inclination angle is used to identify rows into which input rings corresponding to the given circle of the sphere (having the given inclination angle) have been packed.

Cylindrical Implementation of Imaginary 3D Geometric Shape

Optionally, the imaginary 3D geometric shape is a cylinder. In this regard, two dimensions of the cylinder may be curved. Creation of the projection of the visual scene onto an inner surface of the cylinder is similar to creation of the projection of the visual scene onto the inner surface of the sphere. However, since the cylinder is curved in only two dimensions as compared to the sphere (which is curved in three dimensions), a two-dimensional surface curvature of the cylinder provides an ultra-wide horizontal field of view in the curved image.

Optionally, in this regard, the step of creating the projection of the visual scene of the XR environment further comprises:

mapping an x coordinate and a y coordinate of the visual scene of the XR environment to an inclination angle and an azimuthal angle of a cylindrical coordinate system; and mapping a z coordinate of the visual scene of the XR environment to at least one radial coordinate in the cylindrical coordinate system;

wherein the at least one radial coordinate represents an optical depth of the pixel samples of the curved image from the user's eye and is stored in at least one depth buffer.

Optionally, the imaginary 3D geometric shape is the cylinder, wherein the step of dividing comprises:

identifying a line connecting the centre of the cylinder and a given point of the curved image as a zenith direction;

identifying a plurality of rectangles of the cylinder that are arranged symmetrically about the zenith direction;

determining an innermost rectangle from amongst the plurality of rectangles of the cylinder as the input portion; and determining a given ring formed between two adjacent rectangles of the cylinder as a given input ring.

Optionally, the step of packing comprises packing pixel samples of a given input ring into a corresponding row in the second planar image in an order of increasing azimuth.

Optionally, each of the plurality of rectangles of the cylinder is identified based on a function that maps a given inclination angle of a given rectangle of the cylinder to an angular resolution required for the given inclination angle.

Optionally, thicknesses of the plurality of input rings increase on going from the given point of the curved image towards a periphery of the curved image according to said function, and wherein the plurality of rows of the second planar image have a same height.

Optionally, the encoding method further comprises communicating, to the display apparatus, information indicative of the function that maps the given inclination angle of the given rectangle of the cylinder to the angular resolution required for the given inclination angle.

Optionally, a density of pixel samples is variable across the curved image. The density of pixel samples is defined by a number of pixel samples per unit area in the curved image. Herein, the pixel samples in the curved image are considered to be point-like, and do not cover any area individually. Each pixel in an image is a sample on a specific location in the image, from an original two-dimensional image signal. A sample value of a given pixel is estimated using resampling to be such that the sample value closely preserves the original two-dimensional image signal. Typically, in a two-dimensional image, a density of pixel samples is uniform, since the pixel samples are arranged uniformly in a grid structure throughout the two-dimensional image. However, for generating the curved image, the original two-dimensional image signal is resampled into a collection of the pixel samples which are not arranged in the grid structure. The term "resampling" refers to estimating the sample value for each pixel sample location, such that an original image signal is well-preserved. Optionally, image resampling is performed by at least one of: pixel binning, weighted averaging, non-linear median filtering, minimum-maximum filtering, interpolation, image scaling (namely, image resizing). Since the input portion in the curved image would be resolved to a much greater degree of visual detail by the user's eye, as compared to the plurality of input rings when the planar image generated using the curved image is shown to the user, the density of the pixel samples is greater in the input portion as compared to the density of the pixel samples in the plurality of input rings. Notably, the density of pixel samples varies spatially across the curved image to optionally provide the spatially-variable resolution of the curved image. A technical advantage of such variable density of the pixel samples across the curved image is that it emulates natural human eye vision.

It will be appreciated that the imaginary 3D geometric shape may be considered as an ideal surface wherein the pixel samples of the curved image are spaced apart with a random and ideal distance. Furthermore, in such a case, the pixel samples have ideal shapes (for example, point-like shapes). Herein, the random and ideal distance provides the variable density of pixel samples across the curved image. In a scenario, the random distance provides the pixel samples to be spaced apart using a pattern repeated over the curved image. The pattern may be repeated over the curved image once, or multiple times. In another scenario, the random distance provides the pixel samples of the curved image to be randomly dispersed. For example, next interleaved pixel samples having an ideal distance therebetween are utilised in texture sampling and shaders. Computational techniques for creating the pixel samples across the curved image in a required manner (i.e., having a required density and a required shape) that optionally mimics human eye viewing properties, are well-known in the art. As an example, such computational techniques may employ noise, a random function or a map (having a fixed value look up table) to create randomly dispersed pixel samples. As another example, such computational techniques may employ a density function or a density map (having a fixed value look up table) for creating pixel samples having variable resolution.

Optionally, the encoding method further comprises adjusting the density of the pixel samples across the curved image, based on a function that maps a given inclination angle of a given circle of the sphere to an angular resolution required for the given inclination angle. The density of the pixel samples is required to be greater in the input portion as compared to the plurality of input rings, for emulating human eye resolution. The angular resolution of a given point in the curved image is directly related to the density of the pixel samples at the given point. For example, a high angular resolution implies that the density of the pixel samples at the given point is high, and vice versa. In this regard, the function mapping the given inclination angle of the given circle of the sphere to the angular resolution required for the given inclination angle provides a required density of the pixel samples across the curved image, such that the density of the pixel samples across the curved image is effectively and accurately adjusted based on said function.

Optionally, the encoding method further comprises arranging the pixel samples on the inner surface of the imaginary 3D geometric shape according to a sample density function. The term "sample density function" refers to a function which defines the required density of the pixel samples across the inner surface of the imaginary 3D geometric shape. Optionally, a sample density at a given point of the curved image that is obtained according to the sample density function, is inversely proportional to an angle of the given point from gaze direction. In other words, when the angle from the gaze direction increases, the sample density obtained according to the sample density function decreases. Mathematically, the sample density function is represented, for example, as:

$$F(x) = \frac{200}{Z+1},$$

wherein F(x) is a sample density at a given point 'x', Z is the angle of the given point 'x' from the gaze direction. Optionally, when the sample density at the given point of the curved image is greater than 60 samples per degree, the sample density is clamped to a maximum to a maximum value of 60 samples per degree.

Optionally, the encoding method further comprises employing random normal distribution for arranging the pixel samples on the inner surface of the imaginary 3D geometric shape. In other words, the pixel samples on the inner surface of the imaginary 3D geometric shape are arranged according to the sample density function and the random normal distribution. Moreover, a mean of the random normal distribution follows a current sample density distribution.

Optionally, the encoding method further comprises arranging the pixel samples on the inner surface of the imaginary 3D geometric shape according to at least one of: a spiral pattern, a concentric circular pattern, a random pattern. At least one pattern selected from amongst the aforesaid patterns optionally mimics human eye resolution.

In an embodiment, the pixel samples are arranged on the inner surface of the imaginary 3D geometric shape according to the spiral pattern. The spiral pattern is a curved pattern which emanates from a centre point and extends around the centre point in a substantially-circular manner (for example, as a series of circular curves revolving around the centre point). Herein, the pixel samples may be arranged sequentially either in a clockwise manner or in an anti-clockwise manner. Moreover, depending on an orientation of the spiral pattern, the pixel samples may either be arranged to spread outwards from the centre point towards a periphery of the spiral pattern, or be arranged to focus inwards from the periphery of the spiral pattern towards the centre point of the spiral pattern.

In another embodiment, the pixel samples are arranged on the inner surface of the imaginary 3D geometric shape according to the concentric circular pattern. The concentric circular pattern is a curved pattern which typically has a plurality of concentric circles. Herein, the concentric circular pattern may be implemented with or without offsets. These offsets may be fixed or variable. These offsets may be random. A pattern of the offsets may be stored in a similar manner as a typical polar or cartesian texture with known offset pattern or by having a small offset texture that is sampled for the offsets (if using conventional GPU samplers). The pattern of offsets is easy to sample in hardware if dedicated sampling support is added. This pattern of offsets would enable in removing artefacts (for example, such as grid-like artefacts). Moreover, depending on an orientation of the concentric circular pattern, the pixel samples may either be arranged to spread outwards from a centre point of the concentric circular pattern towards a periphery of the concentric circular pattern, or be arranged to focus inwards from the periphery of the concentric circular pattern towards the centre point of the concentric circular pattern.

In yet another embodiment, the pixel samples are arranged on the inner surface of the imaginary 3D geometric shape according to the random pattern. The random pattern is a randomly created pattern having no pre-existing patterns. The random pattern is created by at least one of:
generating the pixel samples sequentially on top of existing pixel samples,
generating the pixel samples based on a given pattern and adjusting the density of the pixel samples using a given logic to obtain a required random density of the pixel samples,
a combination of above.

Optionally, the encoding method further comprises incorporating a noise pattern in the pixel samples of the curved image. The term "noise pattern" refers to an undesired variation of colour information and/or other attributes in a given image. Optionally, the noise pattern is at least one of: a random noise pattern, a fixed pattern noise pattern, a banding noise pattern. It will be appreciated that the noise pattern may be incorporated once in the pixel samples or may be repeated over the pixel samples multiple times. A technical benefit of incorporating the noise pattern is that it ensures that it helps to hide visual artifacts in the curved image.

Optionally, the first planar image and the second planar image are assembled into a single composite image prior to communicating to the display apparatus. Optionally, in this regard, the encoding method comprises communicating, to the display apparatus, the composite image and the information indicative of the size of the input portion and the sizes of the plurality of input rings. Optionally, the encoding method is used for encoding a camera signal from a camera coupled to the encoder. Optionally, in this regard, the information indicative of the gaze direction of the user is used for encoding the camera signal.

The present disclosure also relates to the decoding method as described above. Various embodiments and variants disclosed above, with respect to the aforementioned first aspect, apply mutatis mutandis to the decoding method.

Throughout the present disclosure, the term "decoding method" refers to a method for decoding the encoded images to generate the curved image, and then using the curved image to generate the planar image for display at the display apparatus. The decoding method is implemented via a decoder. Throughout the present disclosure, the term "decoder" refers to specialized equipment that, in operation, decodes the encoded images to yield the planar image. Optionally, the planar image is an XR image. Optionally, in this regard, a sequence of planar images constitutes the visual scene of the XR environment. The decoder executes the decoding method to produce planar images (i.e., decoded images) for rendering the planar images at the display apparatus.

The display apparatus comprises the decoder. Optionally, the decoder is coupled to at least one light source of the display apparatus. Examples of the light source have been provided hereinabove. The decoder executes the decoding method, at the display apparatus, to produce the planar images and communicates the planar images to the at least one light source for displaying. The decoder comprises a processor configured to execute the decoding method. The processor of the decoder is configured to implement the aforesaid steps of the decoding method. The decoder is communicably coupled to the encoder and obtains the first planar image, the second planar image and the information indicative of the size of the output portion and the sizes of the plurality of output rings therefrom.

Throughout the present disclosure, the term "information indicative of the size of the output portion and the sizes of the plurality of output rings" comprises at least one of:
dimensions of the output portion;
dimensions of each output ring among the plurality of output rings, wherein said dimensions are measured in pixels;
angular resolution of the output portion and each output ring among the plurality of output rings;
mathematical functions to be employed for determining the dimensions of each output ring among the plurality of output rings.

It will be appreciated that the dimensions of the output portion are typically same as the dimensions of the input portion. Likewise, the dimensions of output rings (among the plurality of output rings) are typically same as dimensions of corresponding input rings (among the plurality of input rings).

It will be appreciated that the first planar image and the second planar image are obtained repeatedly by the display apparatus, according to the rate at which the first planar image planar and the second planar image are communicated (from the encoder). However, the information indicative of the size of the output portion and sizes of the plurality of output rings could be:
obtained just once at the time of beginning of operation of the display apparatus;
obtained repeatedly by the display apparatus, according to the rate at which the first planar image and the second planar image are communicated; or
pre-known to the decoder of the display apparatus.

The output portion is extracted from the first planar image, based on the size of the output portion. In one embodiment, the size of the output portion is equal to the size of the input portion. In such a case, an entirety of the visual content represented in the first planar image is extracted without any resizing to yield the output portion. In another embodiment, the size of the output portion is smaller than or larger than the size of the input portion. In such a case, an entirety of the visual content represented in the first planar image is extracted whilst using an image resizing algorithm that reduces or enlarges a size of the visual content. Such image resizing algorithms (for example, such as linear and bicubic filtering algorithms) are well known in the art.

The plurality of output rings are unpacked from the plurality of rows of the second planar image, based on the sizes of the plurality of output rings. Herein, the term "unpacking" refers to an image processing technique in which the plurality of rows of the second planar image are upsampled (for example, decompressed) and rearranged into the curved image in a manner that one row is unpacked into one output ring of the curved image. It will be appreciated that the plurality of output rings are unpacked in a manner that adjacent output rings are unpacked adjacently in the curved image.

Optionally, the plurality of output rings are unpacked sequentially from the plurality of rows of the second planar image. In such a case, an innermost output ring (namely, a first output ring) is unpacked from a first row (namely, a top row) of the second planar image, an output ring adjacent to the innermost output ring is unpacked from a second row of the second planar image, and so on until an outermost output ring is unpacked from a last row (namely, a bottom row) of the second planar image. Optionally, the number of output rings among the plurality of output rings is equal to the number of input rings among the plurality of input rings.

The output portion and the plurality of output rings are assembled to generate the curved image. Both the output portion and the plurality of output rings are different (curved) regions of the curved image that, when assembled, collectively form the curved image. The curved image is generated in a manner that the output portion is surrounded by the plurality of output rings. Optionally, the output portion and the plurality of output rings are assembled to yield the curved image in a manner that a centre of the output portion coincides with a centre of the plurality of output rings. In other words, the output portion is optionally concentric with the plurality of output rings.

In an embodiment, the decoding method further comprises:
processing gaze-tracking data, obtained from gaze-tracking means, to determine a gaze direction of the user; and
identifying the gaze direction of the user as a zenith direction,
wherein the step of assembling comprises arranging the output portion and the plurality of output rings symmetrically about the zenith direction.

In this regard, it will be appreciated that assembly of the curved image is performed dynamically, according to the zenith direction which is identified based on the gaze direction of the user. The zenith direction of the curved image is the common centre of the output portion and the plurality of output rings, and therefore, the output portion and the plurality of output rings are considered to be arranged symmetrically about the zenith direction. This dynamic manner of assembling the curved image according to the gaze direction of the user emulates a manner in which users generally focus within their field of view. Therefore, this embodiment pertains to active-foveation based assembling of the curved image. When the curved image is assembled dynamically in this manner, the output portion corresponds to a region immediately surrounding the gaze point of the curved image, whereas the plurality of output rings correspond to a remaining region surrounding the output portion.

Optionally, the display apparatus comprises the gaze-tracking means for detecting the gaze direction of the user. Throughout the present disclosure, the term "gaze-tracking means" refers to specialized equipment for detecting and/or following a direction of gaze of the user of the display apparatus, when said user views the sequence of planar images using the display apparatus. Notably, the gaze direction of the user is detected when the display apparatus in operation is worn by the user. Optionally, the gaze-tracking means is implemented by way of contact lenses with sensors, cameras monitoring the position of the pupil of the user's eye, and the like. Such gaze-tracking means are well-known in the art. Beneficially, the gaze-tracking means is arranged in a manner that said means does not cause any obstruction in an optical path of projections of the sequence of planar images.

Optionally, the gaze-tracking means is configured to measure the gaze-tracking data and process the gaze-tracking data to generate a gaze vector indicative of the gaze direction of the user. In this regard, the gaze point of the planar image is determined by mapping the gaze vector to a corresponding point (namely, coordinate) in the planar image. It will be appreciated that the gaze-tracking means generates the information indicative of the gaze direction of the user, said information comprising at least one of: the gaze-tracking data, the gaze vector.

In another embodiment, the decoding method further comprises identifying a forward line of vision of the user as a zenith direction, wherein the step of assembling comprises arranging the output portion and the plurality of output rings symmetrically about the zenith direction. The forward line of vision is a straight line of vision in front of the user. In such a case, a central region of the curved image corresponds to the output portion, whereas a peripheral region of the curved image corresponds to the plurality of output rings, wherein the peripheral region surrounds the central region. In this regard, it will be appreciated that assembly of the curved image is performed according to the (fixed) zenith direction. A point of the curved image that lies along the zenith direction is the common centre of the output portion and the plurality of output rings. Therefore, the output portion and the plurality of output rings are considered to be arranged symmetrically about the zenith direction. This manner of assembling the curved image emulates another manner in which users generally focus within their field of view. Therefore, this embodiment pertains to fixed-foveation based assembling of the curved image.

The planar image for display refers to an image that is generated from the curved image, wherein said planar image is to be displayed to the user of the display apparatus. Notably, the curved image (i.e., a tunnelized image) is decoded to obtain the planar image. Optionally, an image processing technique (for example, such as perspective projection, ray tracing and the like) is used to form planar counterparts of curved portions in the curved image. Such image processing techniques are well known in the art. The planar image so generated matches a display resolution of the at least one light source of the display apparatus. As an example, for the given pixel in the planar image, an inclination angle and an azimuthal angle may be calculated relative to the zenith direction, and these angles may be mapped to the corresponding location in the curved image using function(s) that map such angles to required angular resolutions. The curved image may be then sampled at the corresponding location to obtain the pixel sample of the corresponding location in the curved image.

Optionally, the pixel value of the given pixel in the planar image is equal to a pixel value of the pixel sample of the corresponding location in the curved image. Alternatively, optionally, a pixel value of the pixel sample of the corresponding location in the curved image is manipulated to generate the pixel value of the given pixel in the planar image. Optionally, in this regard, a filtering operation is applied to the pixel value of the pixel sample of the corresponding location in the curved image.

Optionally, the curved image is generated using the pixel samples, the curved image having a required density of pixel samples and a required sample pixel shape, by employing at least one of: a hardware sampler, a software sampler. This enables the curved image to emulate natural human eye vision. Since the curved image generated by projecting the visual scene on the inner surface of the imaginary 3D shape is known, a sample set of all pixel samples in the curved image is known, and therefore the curved image may be sampled (and additionally, filtered) by at least one of: the hardware sampler, the software sampler, to produce the planar image. Furthermore, patching of new information into the curved image (in addition to existing information) may be also be implemented.

Optionally, the imaginary 3D geometric shape is a sphere, wherein the step of unpacking comprises unpacking pixel samples of a given output ring from a corresponding row in the second planar image in an order of increasing azimuth. Unpacking the pixel samples of the given output ring in the order of increasing azimuth enables unpacking neighbouring pixels of the given output ring in a sequential manner from a corresponding row in the second planar image. This improves an efficiency and accuracy of the decoding method.

Optionally, each of the plurality of output rings is formed between two adjacent circles from amongst a plurality of circles of the sphere, and wherein each of the plurality of circles is identified based on a function that maps a given inclination angle of a given circle of the sphere to an angular resolution required for the given inclination angle.

Optionally, thicknesses of the plurality of output rings increase on going from a given point of the curved image that intersects with a zenith direction towards a periphery of the curved image according to said function, and wherein the plurality of rows of the second planar image have a same height. In this regard, different rows of the second planar image having the same height are upsampled to different extents to yield their corresponding output rings having variable thicknesses. The thicknesses of the plurality of output rings may be measured in pixels, degrees, or similar. Alternatively, optionally, the plurality of output rings have a same thickness and heights of the plurality of rows of the second planar image vary according to said function.

Optionally, the decoding method further comprises obtaining information indicative of the function that maps the given inclination angle of the given circle of the sphere to the angular resolution required for the given inclination angle. This information is obtained from the encoder.

Optionally, a density of pixel samples is variable across the curved image.

Optionally, the density of the pixel samples varies across the curved image, based on a function that maps a given inclination angle of a given circle of the sphere to an angular resolution required for the given inclination angle.

Optionally, the pixel samples are arranged on the inner surface of the imaginary 3D geometric shape according to a sample density function.

Optionally, the pixel samples are arranged on the inner surface of the imaginary 3D geometric shape according to at least one of: a spiral pattern, a concentric circular pattern, a random pattern.

DETAILED DESCRIPTION OF THE DRAWINGS

Referring to FIG. 1, illustrated are steps of an encoding method, in accordance with an embodiment of the present disclosure. At step 102, a curved image is generated by creating a projection of a visual scene of an extended-reality environment onto an inner surface of an imaginary 3D geometric shape. The imaginary 3D geometric shape is curved in at least one dimension, wherein a centre of the imaginary 3D geometric shape corresponds to a position of a user's eye in the extended-reality environment. At step 104, the curved image is divided into an input portion and a plurality of input rings. At step 106, the input portion and the plurality of input rings of the curved image are encoded into a first planar image and a second planar image. The input portion of the curved image is stored into the first planar image. The plurality of input rings of the curved image are packed into the second planar image. The second planar image has a plurality of rows. A given input ring of the curved image is packed into a corresponding row of the second planar image. At step 108, the first planar image, the second planar image and information indicative of a size of the input portion and sizes of the plurality of input rings are communicated to a display apparatus.

The steps 102, 104, 106, and 108 are only illustrative and other alternatives can also be provided where one or more steps are added, one or more steps are removed, or one or more steps are provided in a different sequence without departing from the scope of the claims herein.

Figure 2A:
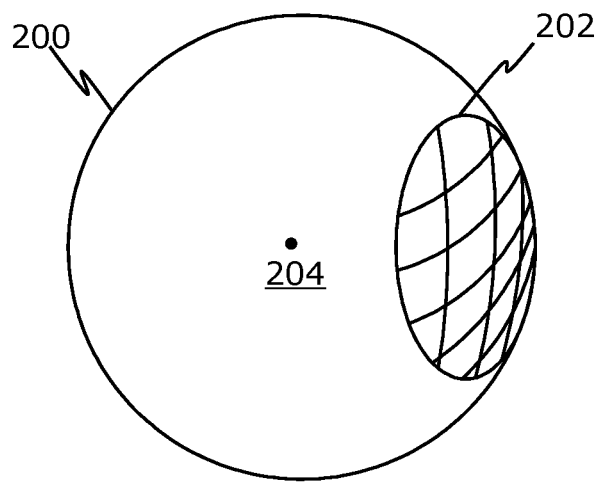

Referring to FIG. 2A, illustrated is an imaginary 3D geometric shape 200 and a curved image 202 generated using the imaginary 3D geometric shape 200, in accordance with an embodiment of the present disclosure. The imaginary 3D geometric shape 200 is illustrated as a sphere, using which the curved image 202 is generated. The curved image 202 is generated by creating a projection of a visual scene of an extended-reality environment onto an inner surface of the imaginary 3D geometric shape 200. The visual scene is projected from a centre 204 of the imaginary 3D geometric shape 200. The centre 204 of the imaginary 3D geometric shape 200 corresponds to a position of a user's eye (not shown) in the extended-reality environment.

Figure 2B:
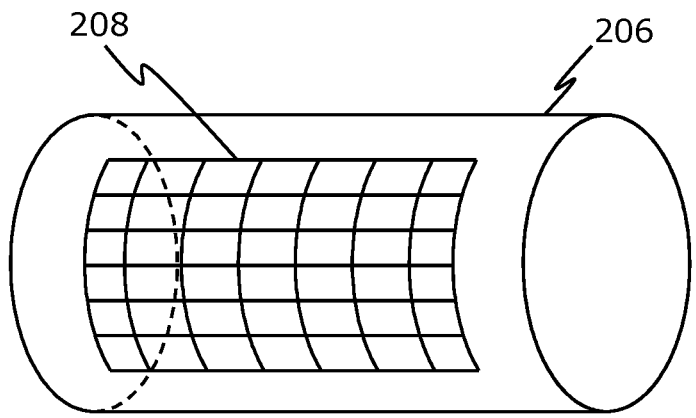

Referring to FIG. 2B, illustrated is an imaginary 3D geometric shape 206 and a curved image 208 generated using the imaginary 3D geometric shape 206, in accordance with another embodiment of the present disclosure. The imaginary 3D geometric shape 206 is illustrated as a cylinder, using which the curved image 208 is generated. The curved image 208 is generated by creating a projection of a visual scene of an extended-reality environment onto an inner surface of the imaginary 3D geometric shape 206.

Figure 2C:
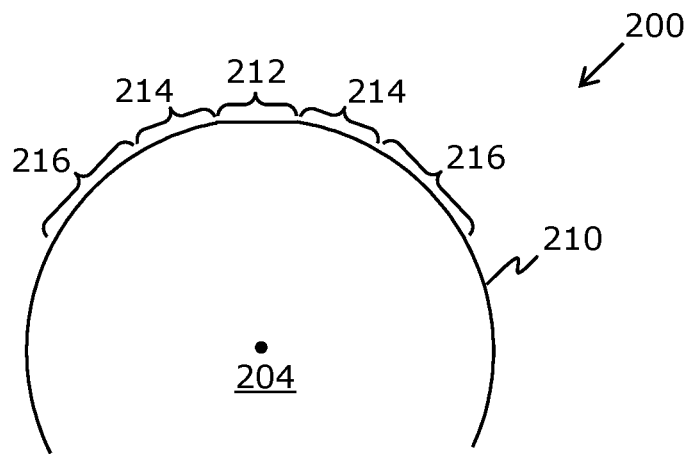
FIG. 2C illustrates a top-down view of an image projection surface of the imaginary 3D geometric shape of FIG. 2A, in accordance with an embodiment of the present disclosure.

Referring to FIG. 2C, illustrated is a top-down view of an image projection surface 210 of the imaginary 3D geometric shape 200 of FIG. 2A, in accordance with an embodiment of the present disclosure. A central area 212 along a zenith direction (not shown) from the centre 204 of the imaginary 3D geometric shape 200 is nearly flat, and a portion of the projection of the visual scene corresponding to the central area 212 is an input portion of the curved image 202. A portion of the projection of the visual scene corresponding to an area 214 (that forms a rim around the central area 212) is a first input ring of the curved image 202, a portion of the projection of the visual scene corresponding to an area 216 (that forms a rim around the area 214) is a second input ring of the curved image 202, and so on.

FIGS. 2A, 2B and 2C are merely simplified example illustrations of the imaginary 3D geometric shapes 200 and 206, the curved image 202 and 208, and the image projection surface 210, for sake of clarity only, and should not unduly limit the scope of the claims herein. A person skilled in the art will recognize many variations, alternatives, and modifications of embodiments of the present disclosure.

Figure 3A:
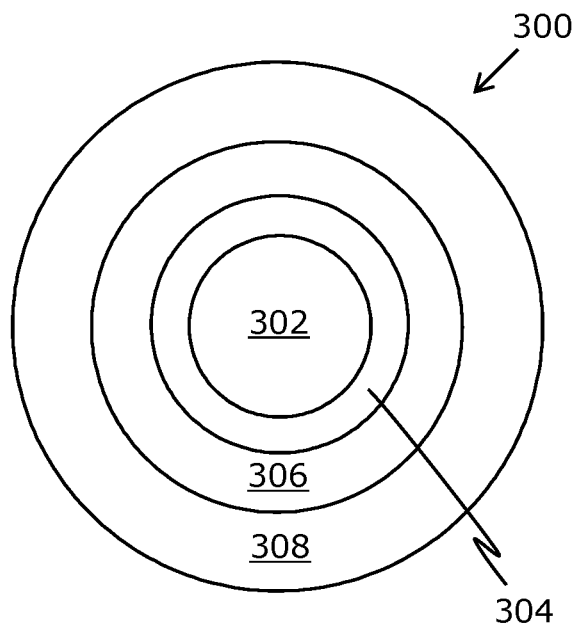
FIGS. 3A-3C illustrate how a curved image is divided into an input portion and a plurality of input rings, in accordance with various embodiments of the present disclosure.
Figure 3B:
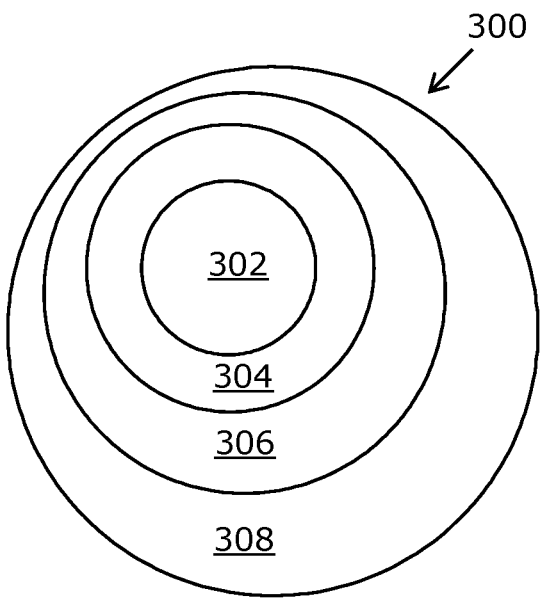
Figure 3C:
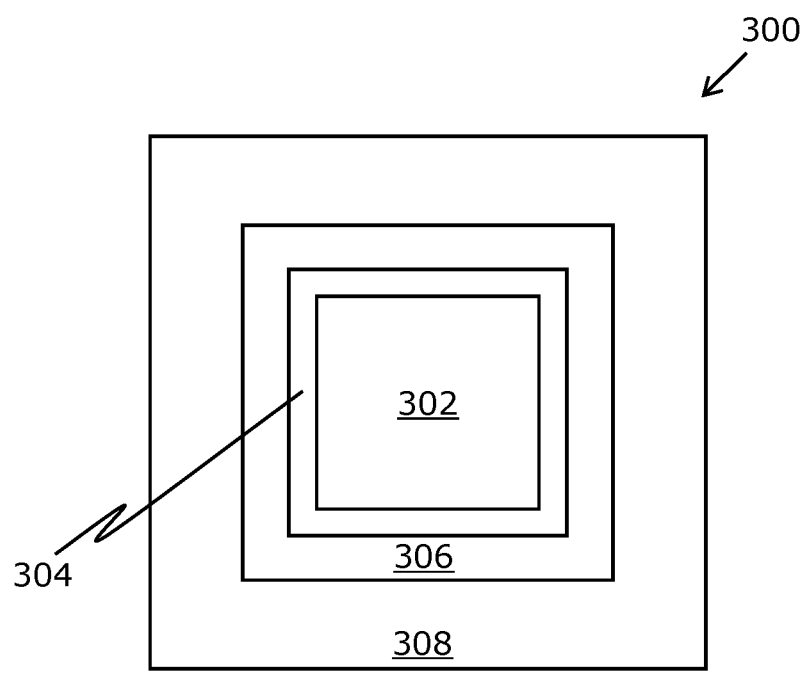

Referring to FIGS. 3A, 3B, and 3C, illustrated is how a curved image 300 is divided into an input portion 302 and a plurality of input rings 304, 306, and 308, in accordance with various embodiments of the present disclosure. In FIG. 3A, the curved image 300 is shown to be divided into the input portion 302 and the plurality of input rings 304, 306, and 308, which are concentric with the input portion 302. The input portion 302 and the plurality of input rings 304, 306, and 308, are shaped as circles, for sake of simplicity only. Each input ring is symmetrical and is shown to have a same thickness in all its portions. Thicknesses of the plurality of input rings 304, 306, and 308 increase on going from a centre of the curved image 300 towards a periphery of the curved image 300, optionally varying according to a function that maps a given inclination angle of a given circle of a sphere to an angular resolution required for the given inclination angle.

In FIG. 3B, the curved image 300 is shown to be divided into the input portion 302 and the plurality of input rings 304, 306, and 308. The input portion 302 and the plurality of input rings 304, 306, and 308, are shaped as circles, for sake of simplicity only. The input ring 304 is symmetrical with respect to the input portion 302, such that thickness of the input ring 304 is same throughout its different portions. The input ring 306 is asymmetrical about the input portion 302 and the input ring 304, such that thickness of the input ring 306 is different in its different portions. The input ring 308 is asymmetrical about the input portion 302 and the input rings 304 and 306, such that thickness of the input ring 308 is different in its different portions.

In FIG. 3C, the curved image 300 is shown to be divided into the input portion 302 and the plurality of input rings 304, 306, and 308 that are shaped as rectangles, for sake of simplicity only. The plurality of input rings 304, 306, and 308 are shown to be concentric with the input portion 302.

FIGS. 3A, 3B, and 3C are merely simplified example illustrations of curved image 300 for sake of clarity only, and should not unduly limit the scope of the claims herein. A person skilled in the art will recognize many variations, alternatives, and modifications of embodiments of the present disclosure.

Figure 4A:
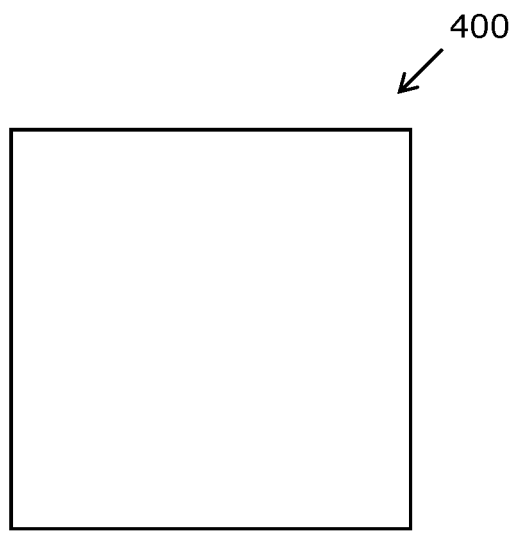
Figure 4B:
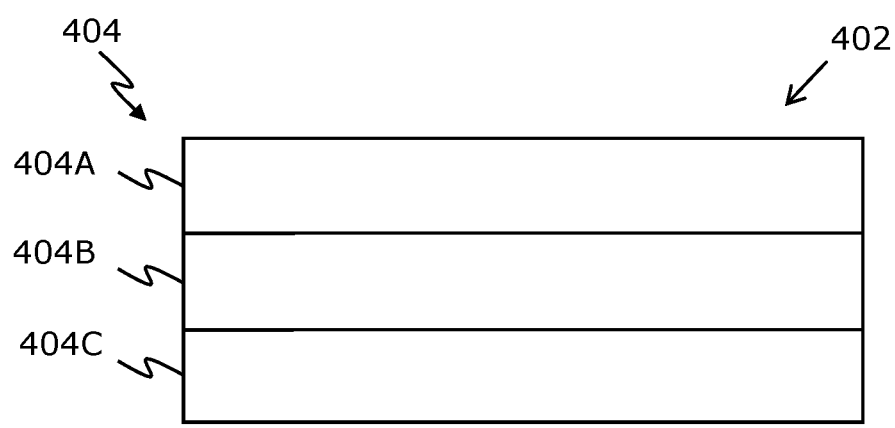
FIG. 4B illustrates a second planar image that are generated from the curved image of any of FIGS. 3A-3C, in accordance with an embodiment of the present disclosure.

Referring to FIGS. 4A, and 4B, FIG. 4A illustrates a first planar image 400, while FIG. 4B illustrates a second planar image 402 that are generated from the curved image 300 of any of FIGS. 3A-3C, in accordance with an embodiment of the present disclosure. In FIG. 4A, the first planar image 400 is shown to store the input portion 302 of the curved image. A size of the first planar image 400 depends on a size of the input portion 302. The first planar image 400 is shown as a planar image having a square shape corresponding to a given shape of the input portion 302. In FIG. 4B, the second planar image 402 is shown to pack the plurality of input rings 304, 306, and 308 of the curved image 300. The second planar image 402 has a plurality of rows 404 (individually depicted as rows 404A, 404B and 404C). The plurality of rows 404 have a same height. Notably, the input ring 304 is packed into the row 404A, the input ring 306 is packed into the row 404B, while the input ring 308 is packed into the row 404C.

FIGS. 4A, and 4B are merely simplified example illustrations of the first planar image 400 and the second planar image 402, respectively, for sake of clarity only, and should not unduly limit the scope of the claims herein. A person skilled in the art will recognize many variations, alternatives, and modifications of embodiments of the present disclosure.

Figure 5A:
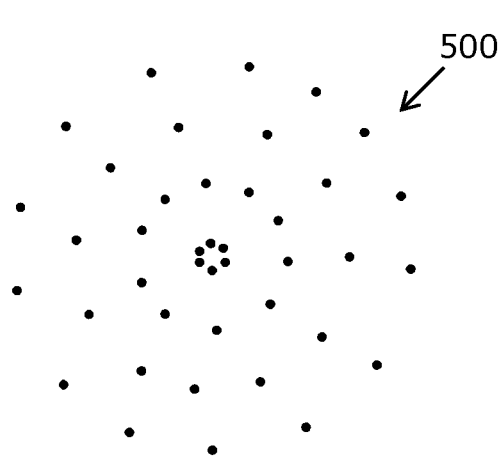
FIGS. 5A-5D illustrate how pixel samples are arranged on an inner surface of an imaginary 3D geometric shape, in accordance with various embodiments of the present disclosure.
Figure 5B:
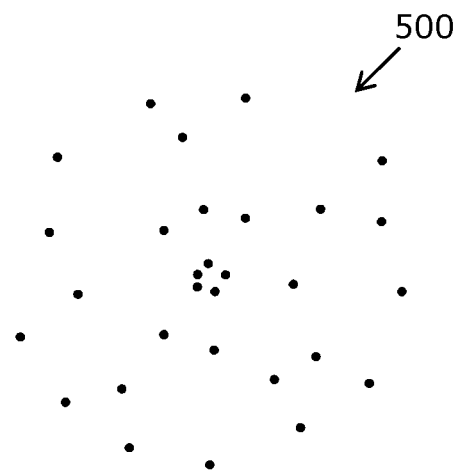
Figure 5C:
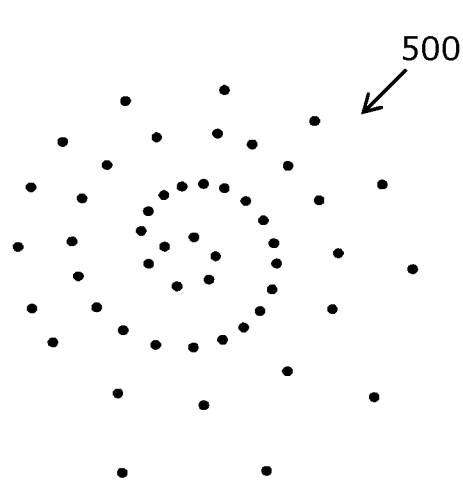
Figure 5D:
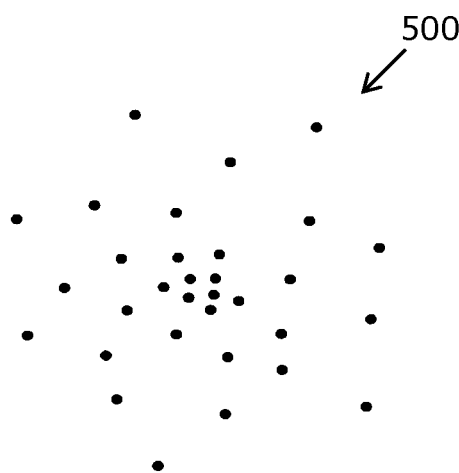

Referring to FIGS. 5A, 5B, 5C and 5D, illustrated is how pixel samples 500 are arranged on an inner surface of an imaginary 3D geometric shape (not shown), in accordance with various embodiments of the present disclosure. In FIG. 5A, the pixel samples 500 are arranged on the inner surface of the imaginary 3D geometric shape according to a concentric circular pattern. A density of the pixel samples 500 is shown to reduce while moving from a centre of the concentric circular pattern to a periphery of the concentric circular pattern. In FIG. 5B, the pixel samples 500 are arranged on the inner surface of the imaginary 3D geometric shape according to a concentric circular pattern having offsets. The pixel samples 500 are shown to be arranged in concentric circles having some randomness introduced in the concentric circular pattern in respect of a density of the pixel samples 500, using such offsets. In FIG. 5C, the pixel samples 500 are arranged on the inner surface of the imaginary 3D geometric shape according to a spiral pattern. The pixel samples 500 are shown to be arranged in a manner that a density of the pixel samples 500 is maximum at a centre of the spiral pattern and gradually reduces while moving from the centre towards a periphery of the spiral pattern. In FIG. 5D, the pixel samples 500 are arranged on the inner surface of the imaginary 3D geometric shape according to a random pattern. The pixel samples 500 are shown to be arranged randomly without following any apparent shape or pattern. Still, a density of the pixel samples 500 is shown to reduce on moving from a centre of the random pattern towards a periphery of the random pattern.

FIGS. 5A, 5B, 5C and 5D are merely simplified example illustrations of how pixel samples 500 are being arranged on the inner surface of the imaginary 3D geometric shape, for sake of clarity only, and should not unduly limit the scope of the claims herein. A person skilled in the art will recognize many variations, alternatives, and modifications of embodiments of the present disclosure.

Figure 6:
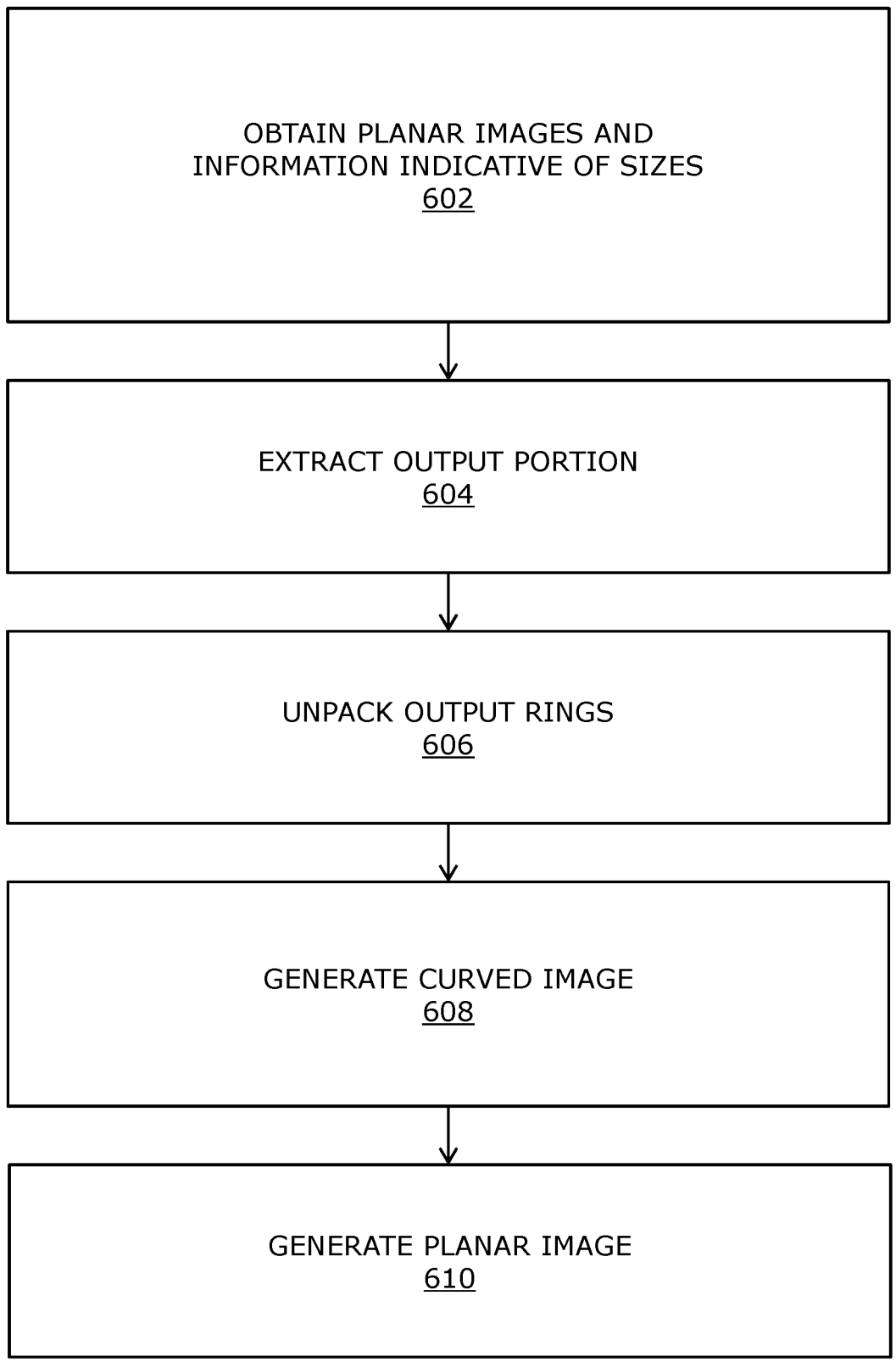
FIG. 6 illustrates steps of a decoding method, in accordance with an embodiment of the present disclosure.

Referring to FIG. 6, illustrated are steps of a decoding method, in accordance with an embodiment of the present disclosure. The decoding method is implemented at a display apparatus. At step 602, a first planar image, a second planar image and information indicative of a size of an output portion and sizes of a plurality of output rings are obtained. At step 604, the output portion is extracted from the first planar image based on the size of the output portion. At step 606, the plurality of output rings are unpacked from a plurality of rows of the second planar image based on the sizes of the plurality of output rings. At step 608, the output portion and the plurality of output rings are assembled to generate a curved image. The curved image represents a projection of a visual scene of an extended-reality environment onto an inner surface of an imaginary 3D geometric shape. The imaginary 3D geometric shape is curved in at least one dimension, wherein a centre of the imaginary 3D geometric shape corresponds to a position of a user's eye in the extended-reality environment. At step 610, a planar image is generated from the curved image, for display at the display apparatus. For a given pixel in the planar image, a corresponding location in the curved image is determined. A pixel sample of the corresponding location in the curved image is employed to generate a pixel value of the given pixel in the planar image.

The steps 602, 604, 606, 608 and 610 are only illustrative and other alternatives can also be provided where one or more steps are added, one or more steps are removed, or one or more steps are provided in a different sequence without departing from the scope of the claims herein.

Figure 7:
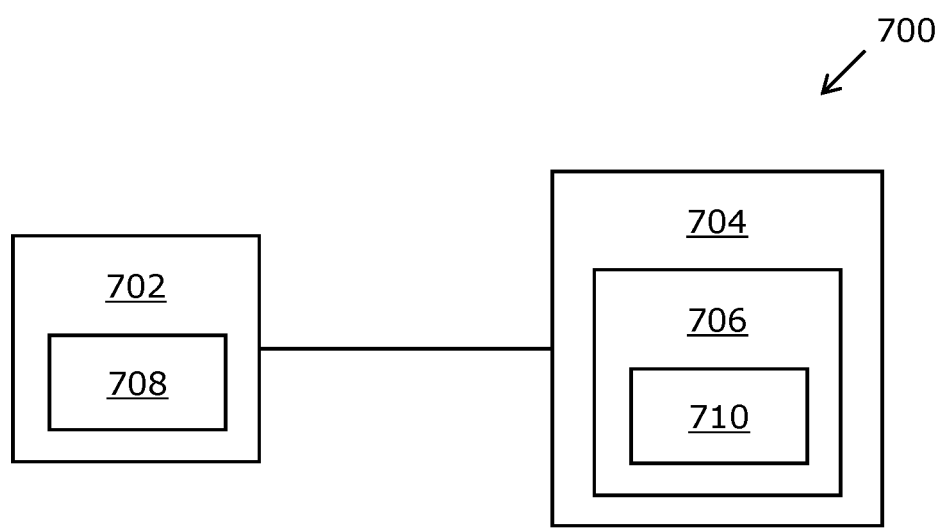
FIG. 7 illustrates an exemplary environment wherein an encoding method and a decoding method are implemented, in accordance with an embodiment of the present disclosure.

Referring to FIG. 7, illustrated is an exemplary environment 700 wherein an encoding method and a decoding method is implemented, in accordance with an embodiment of the present disclosure. The encoding method is implemented via an encoder 702, whereas the decoding method is implemented at a display apparatus 704. At the display apparatus 704, the decoding method is implemented via a decoder 706. The encoder 702 is communicably coupled to the display apparatus 704 (and optionally, to the decoder 706). The encoder 702 comprises a processor 708 configured to execute the encoding method, whereas the decoder 706 comprises a processor 710 configured to execute the decoding method.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An encoding method comprising:
    generating a curved image by creating a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment;
    dividing the curved image into an input portion and a plurality of input rings;
    encoding the input portion and the plurality of input rings of the curved image into a first planar image and a second planar image, respectively, wherein the step of encoding comprises:
        storing the input portion of the curved image into the first planar image;
        packing the plurality of input rings of the curved image into the second planar image, the second planar image having a plurality of rows, a given input ring of the curved image being packed into a corresponding row of the second planar image; and
    communicating, to a display apparatus, the first planar image, the second planar image and information indicative of a size of the input portion and sizes of the plurality of input rings.

2. The encoding method of claim 1, wherein the step of storing comprises employing any of: perspective projection, ray tracing to create from the input portion the first planar image, and wherein the step of packing comprises:
    employing any of: perspective projection, ray tracing to create from each of the plurality of input rings a corresponding 2D ring; and
    packing the corresponding 2D ring into a corresponding row of the second planar image.

3. The encoding method of claim 1, wherein the curved image has a spatially-variable resolution.

4. The encoding method of claim 1, wherein the step of generating the curved image comprises:
- rasterizing an entire field of view of the visual scene of the extended-reality environment into a first framebuffer at a first resolution; and
- rasterizing a portion of the field of view of the visual scene that corresponds to at least the input portion of the curved image into a second framebuffer at a second resolution, the second resolution being higher than the first resolution, further wherein the step of encoding comprises:
- selecting, for a given pixel of the curved image, a pixel value having a highest resolution available from the first resolution of the first framebuffer and the second resolution of the second framebuffer; and
- using the selected pixel value for the given pixel of the curved image during the step of storing and optionally during the step of packing.

5. The encoding method of claim 1, further comprising:
- obtaining, from the display apparatus, information indicative of a gaze direction of a user;
- determining a gaze point of the curved image based on the gaze direction of the user; and
- identifying a line connecting the centre of the imaginary 3D geometric shape with the gaze point of the curved image as a zenith direction, wherein the input portion and the plurality of input rings are arranged symmetrically about the zenith direction.

6. The encoding method of claim 1, further comprising identifying a line connecting the centre of the imaginary 3D geometric shape with a centre of the curved image as a zenith direction, wherein the input portion and the plurality of input rings are arranged symmetrically about the zenith direction.

7. The encoding method of any claim 1, wherein the imaginary 3D geometric shape is a sphere, wherein the step of dividing comprises:
- identifying a line connecting the centre of the sphere and a given point of the curved image as a zenith direction;
- identifying a plurality of circles of the sphere that are arranged symmetrically about the zenith direction;
- determining an innermost circle from amongst the plurality of circles of the sphere as the input portion; and
- determining a given ring formed between two adjacent circles of the sphere as a given input ring.

8. The encoding method of claim 7, wherein the step of packing comprises packing pixel samples of a given input ring into a corresponding row in the second planar image in an order of increasing azimuth.

9. The encoding method of claim 7, wherein each of the plurality of circles of the sphere is identified based on a function that maps a given inclination angle of a given circle of the sphere to an angular resolution required for the given inclination angle.

10. The encoding method of claim 9, wherein thicknesses of the plurality of input rings increase on going from the given point of the curved image towards a periphery of the curved image according to said function, and wherein the plurality of rows of the second planar image have a same height.

11. The encoding method of claim 9, further comprising communicating, to the display apparatus, information indicative of the function that maps the given inclination angle of the given circle of the sphere to the angular resolution required for the given inclination angle.

12. The encoding method of claim 7, wherein a density of pixel samples is variable across the curved image.

13. The encoding method of claim 12, further comprising adjusting the density of the pixel samples across the curved image, based on a function that maps a given inclination angle of a given circle of the sphere to an angular resolution required for the given inclination angle.

14. The encoding method of claim 12, further comprising arranging the pixel samples on the inner surface of the imaginary 3D geometric shape according to a sample density function.

15. The encoding method of claim 12, further comprising arranging the pixel samples on the inner surface of the imaginary 3D geometric shape according to at least one of: a spiral pattern, a concentric circular pattern, a random pattern.

16. The encoding method of claim 12, further comprising incorporating a noise pattern in the pixel samples of the curved image.

17. A decoding method, implemented at a display apparatus, comprising:
- obtaining a first planar image, a second planar image and information indicative of a size of an output portion and sizes of a plurality of output rings;
- extracting the output portion from the first planar image based on the size of the output portion;
- unpacking the plurality of output rings from a plurality of rows of the second planar image based on the sizes of the plurality of output rings;
- assembling the output portion and the plurality of output rings to generate a curved image, wherein the curved image represents a projection of a visual scene of an extended-reality environment onto an inner surface of an imaginary 3D geometric shape, the imaginary 3D geometric shape being curved in at least one dimension, wherein a centre of the imaginary 3D geometric shape corresponds to a position of a user's eye in the extended-reality environment; and
- generating from the curved image a planar image for display at the display apparatus, wherein the step of generating comprises:
  - determining, for a given pixel in the planar image, a corresponding location in the curved image; and
  - employing a pixel sample of the corresponding location in the curved image to generate a pixel value of the given pixel in the planar image.

18. The decoding method of claim 17, further comprising:
- processing gaze-tracking data, obtained from gaze-tracking means, to determine a gaze direction of the user; and
- identifying the gaze direction of the user as a zenith direction, wherein the step of assembling comprises arranging the output portion and the plurality of output rings symmetrically about the zenith direction.

19. The decoding method of claim 17, further comprising identifying a forward line of vision of the user as a zenith direction, wherein the step of assembling comprises arranging the output portion and the plurality of output rings symmetrically about the zenith direction.

20. The decoding method of claim 17, wherein the imaginary 3D geometric shape is a sphere, wherein the step of unpacking comprises unpacking pixel samples of a given output ring from a corresponding row in the second planar image in an order of increasing azimuth.

21. The decoding method of claim 20, wherein each of the plurality of output rings is formed between two adjacent circles from amongst a plurality of circles of the sphere, and wherein each of the plurality of circles is identified based on a function that maps a given inclination angle of a given circle of the sphere to an angular resolution required for the given inclination angle.

22. The decoding method of claim 21, wherein thicknesses of the plurality of output rings increase on going from a given point of the curved image that intersects with a zenith direction towards a periphery of the curved image according to said function, and wherein the plurality of rows of the second planar image have a same height.

23. The decoding method of claim 21, further comprising obtaining information indicative of the function that maps the given inclination angle of the given circle of the sphere to the angular resolution required for the given inclination angle.

24. The decoding method of claim 20, wherein a density of pixel samples is variable across the curved image.

25. The decoding method of claim 24, wherein the density of the pixel samples varies across the curved image, based on a function that maps a given inclination angle of a given circle of the sphere to an angular resolution required for the given inclination angle.

26. The decoding method of claim 24, wherein the pixel samples are arranged on the inner surface of the imaginary 3D geometric shape according to a sample density function.

27. The decoding method of claim 24, wherein the pixel samples are arranged on the inner surface of the imaginary 3D geometric shape according to at least one of: a spiral pattern, a concentric circular pattern, a random pattern.

\* \* \* \* \*